United States Patent
Anspach et al.

(10) Patent No.: US 7,390,554 B2
(45) Date of Patent: *Jun. 24, 2008

(54) MOISTURE-SINK LAYER, COMPOSITION AND MULTI-LAYERED ARTICLE

(75) Inventors: Kean M. Anspach, Quarryville, PA (US); William J. Kauffman, Manheim, PA (US)

(73) Assignee: AWI Licensing Company, Wilmington, DE (US)

( * ) Notice: Subject to any disclaimer, the term of this patent is extended or adjusted under 35 U.S.C. 154(b) by 200 days.

This patent is subject to a terminal disclaimer.

(21) Appl. No.: 10/954,439

(22) Filed: Sep. 30, 2004

(65) Prior Publication Data

US 2005/0123766 A1    Jun. 9, 2005

Related U.S. Application Data

(62) Division of application No. 10/418,015, filed on Apr. 17, 2003, now Pat. No. 6,902,823.

(51) Int. Cl.
*B32B 7/04*    (2006.01)

(52) U.S. Cl. .................. 428/142; 428/520; 428/521; 156/324.4

(58) Field of Classification Search .......... 428/142, 428/520, 521; 156/324.4
See application file for complete search history.

(56) References Cited

U.S. PATENT DOCUMENTS 6,902,823 B2 *  6/2005   Anspach et al. ............. 428/520

FOREIGN PATENT DOCUMENTS

| DE | 141 287 | 4/1980 |
|---|---|---|
| DE | 101 24 535 A 1 | 11/2002 |
| WO | 0123479 A1 * | 4/2001 |
| WO | WO 01/23479 A1 | 4/2001 |
| WO | WO 03/076711 A1 | 9/2003 |

OTHER PUBLICATIONS

European Search Report Communication—Application No. EP 04 00 9120 dated May 25, 2005.

* cited by examiner

*Primary Examiner*—Leszek Kiliman

(57) ABSTRACT

Disclosed is decorative surface covering that has a substantially non-aqueous absorptive layer and a water retentive layer. The decorative surface covering may be a vinyl-backed floor covering that can be adhered to a substantially non-aqueous absorptive subfloor with a water-based adhesive. The water retentive layer is formed from a polymer matrix and super absorbent water retentive particles. The water retentive layer may also include a hydrophilic additive to facilitate movement of water from the adhesive to the super absorbent water retentive particles. The water retentive layer may also be applied to the substantially non-aqueous absorptive subfloor.

22 Claims, No Drawings

MOISTURE-SINK LAYER, COMPOSITION AND MULTI-LAYERED ARTICLE

This application is a divisional application Ser. No. 10/418,015, filed Apr. 17, 2003 now U.S. Pat. No. 6,902,823.

TECHNICAL FIELD

The present invention is related to decorative surface coverings and in greater detail to decorative surface coverings incorporating a moisture-sink backing layer capable of use in a flooring system.

BACKGROUND

Decorative surface coverings may be attached to a surface, such as a flooring substrate, by the application of an adhesive to the decorative surface covering and/or the surface or substrate. Adhesives may be based on a volatile organic solvent or compound (VOC) or water. For environmental concerns, water-based adhesives typically are preferred over those adhesives containing VOCs. Unfortunately, when substantially non-porous decorative surface coverings are applied to a substrate using a water-based adhesive, the adhesive often fails due to the failure of the adhesive to properly cure. The same is also true for decorative surface coverings that are applied to substantially non-porous flooring substrates. A major contributing factor to the failure of the adhesive to cure is the inability of the water to be drawn off from the adhesive during the curing process.

An example of a substantially non-porous decorative surface covering is a vinyl-backed floor covering. Vinyl-backed floor coverings often are applied over a previously installed layer of vinyl flooring. Attaching such non-porous vinyl floor coverings to each other cannot be accomplished using conventional water-based adhesives. When a water-based adhesive is used between a non-porous substrate and a vinyl-backed floor covering there is no place for the water to go. Thus, the adhesive stays wet.

One method for installing a decorative surface covering over a substantially non-porous flooring substrate includes the use of a "felt" backed vinyl floor. Often such non-porous substrates or subfloors are previously laid vinyl floors. The felt backing enables the water/moisture of the adhesive to penetrate and be absorbed by the felt allowing the adhesive to dry and produce good bond strength. However, during installation, the felt backing in some flooring structures may crack if not handled carefully, and create visual and installed performance problems. In contrast, vinyl-backed floors, particularly glass encapsulated vinyl flooring that dominate the European market, are easier to handle during installation, and impart a perceived firm-flex/feel value to the customer.

Another method for attaching non-porous decorative surface coverings to non-porous substrates includes the use of a pressure sensitive adhesive. Unfortunately, pressure sensitive adhesives are more expensive than other commonly used adhesives and require extended drying times in the installation of such floors.

Thus, what is needed is a non-porous decorative surface covering that can be used with a water-based adhesive without the need of a felt backing or an expensive pressure sensitive adhesive.

SUMMARY

The present invention generally incorporates the use of highly water retentive particles set within a layer applied to the back side of a decorative surface covering or to a surface or substrate. In one embodiment, the decorative surface covering is a vinyl-backed floor covering that does not absorb a substantial amount of water from an applied adhesive so that the adhesive does not fully cure (i.e. substantially non-aqueous absorptive) and that may be applied to a non-porous or substantially non-aqueous absorptive subfloor. The layer includes enough water retentive particles to draw the water away from a water-based adhesive so as to allow it to dry. The layer may be formed from a polymer matrix having an amphoteric nature enhanced by additives to facilitate movement of water from the adhesive.

In greater detail, the decorative surface covering may comprise a water retentive layer adhered to a decorative layer wherein the water retentive layer includes a water permeable polymer matrix and super absorptive water retentive particles. The water retentive layer may include a hydrophilic additive. The super absorptive water retentive particles are capable of absorbing at least 50 times their weight in water and may include a polyacrylic acid or salt. Some super absorptive water retentive particles are capable of absorbing at least 100 times their weight in water and others are capable of absorbing at least 400 times their weight in water. In one embodiment these polyacrylic particles are sized between about 2 mils and about 10 mils.

A further embodiment includes a water retentive layer composition comprising, on a weight percent basis, a polymer binder, super absorbent water retentive particles and an optional hydrophilic additive. In one embodiment, the water retentive layer composition comprises about 45% to about 99% by weight of the polymer binder and about 1% to about 10% by weight of the super absorbent water retentive particles.

If present, the water retentive layer composition may comprise about 1% to about 50% by weight of the hydrophilic additive. It is believed that use of greater than about 50% by weight of the hydrophilic additive can inhibit setting of the adhesive and can adversely affect adhesion. It is believed that the excessive amount of hydrophilic additive deters absorption of the water into the water retentive particles, which can result in a gummy layer with poor mechanical properties.

In another embodiment, the water retentive layer composition comprises about 5% to about 40% by weight of the hydrophilic additive. In a third embodiment, the water retentive layer composition comprises about 10% to about 35% of the hydrophilic additive.

The water retentive layer composition may be applied to a substrate in a different embodiment. The water retentive layer composition is cured, generally by drying, either on the decorative surface covering or on the substrate.

An additional embodiment includes a flooring system comprising a subfloor, a decorative surface covering having a substantially non-aqueous absorptive decorative floor covering, a water retentive layer interposed between the decorative surface covering and the substrate, wherein the water retentive layer includes a water permeable polymer binder matrix and super absorbent water retentive particles. A water-based adhesive adheres the decorative surface covering to a flooring subfloor. Additionally, the flooring subfloor may comprise a substantially non-aqueous absorptive, previously installed, flooring product.

DETAILED DESCRIPTION

The present invention, in an embodiment, comprises a decorative surface covering including a water retentive layer adhered to the decorative surface covering. The layer includes a water permeable polymer binder matrix and super absorbent water retentive particles. The water retentive particles are adhered to the decorative surface covering by the polymer binder matrix. The water retentive particles can reside within or on the polymer binder matrix. The water retentive layer may include a hydrophilic additive selected from components such as those described in WO 00/31181, which is incorporated herein in its entirety by reference, and anti-static agents such as those described in U.S. Pat. No. 5,091,452, U.S. Pat. No. 4,944,998, and U.S. Pat. No. 4,800,115, which are incorporated herein in their entirety by reference.

The water permeable polymer matrix allows the water or moisture contained in the adhesive to migrate to the super absorbent water retentive particles at a rate that allows bonding to occur within a desirable time. The rate of bonding is dependent upon the type of adhesive used, the amount of water found in the adhesive, and the rate of moisture migration into the water retentive particles. Furthermore, the rate of drying of the adhesive is controlled such that it does not dry too quickly thereby resulting in a loss of adhesion, and allow appropriate time for installation.

Water Permeable Polymer System

The polymer matrix may be comprised of any polymer binder compatible with the flooring structure, such as a polyvinyl chloride polymers or copolymers, or polyolefin polymers or copolymers. Examples of polyvinyl chloride (PVC) binder systems, both polymer or copolymer, include plastisols, organisols, solutions and melt processed materials.

The term "water permeable" includes polymer matrices capable of allowing water to pass through the polymer system to reach the water retentive particles. Furthermore, the term "water permeable" includes polymer matrices incorporating hydrophilic additives that aid in drawing water through the polymer matrix to the water retentive particles contained therein.

The hydrophilic additives can include any hydrophilic additive compatible with the polymer matrix. Example additives include polyether glycols and others described in WO 00/31181 and anti-static agents such as those described in U.S. Pat. No. 5,091,452, U.S. Pat. No. 4,944,998, and U.S. Pat. No. 4,800,115. The selection of additive is based upon the polymer binder employed in the flooring structure. The hydrophilic additive selected must not only provide sufficient moisture migration, but also must not negatively affect the adhesive bond.

Other additives may be included in the water retentive layer composition to improve the properties of the water retentive layer. Such additives include pH controlling agents, anti-bacterial compounds, surfactants, fillers and solvents. Generally, the solvents are driven off as the water retentive layer composition is cured.

Super Absorbent Water Retentive Particles

The water retentive particles are not restricted to any one shape. Additionally, the water retentive particles can include any known super absorbent. The term "super absorbent" is intended to include absorbent material that is capable of absorbing at least 50 times its weight of water. Some super absorbents are capable of absorbing at least 100 times its weight of water and other are capable of absorbing at least 400 times its weight of water. Examples of such particles include sodium polyacrylate, potassium polyacrylate, potassium polyacrylate/polyacrylamide copolymer. Additionally, U.S. Pat. No. 5,883,158 lists a number of leading super absorbent polymer types, which is incorporated by reference in its entirety herein.

The size of the super absorbent water retentive particles may vary from less than 1 mil to about 20 mils in diameter. The selection of the particles size of the water retentive particles is dependent upon the thickness of the polymer film layer, the amount of water in the adhesive, the rate of adhesive drying desired, and the effect of particle size on adhesive bond strength. As the particles absorb moisture, they expand in volume. Larger particles absorb more moisture, therefore fewer particles can be used, which results in less surface area being occupied by the particles and more distance between the particles. This maximizes the contact area with the adhesive between the particles and can minimize any loss of adhesion due to swelling or dimensional change.

Additionally, there can be a relationship between the size of the particle and the percent weight the particles comprise of the layer formula. This relationship equates the distance water can move in a given time period with how far apart the particles reside. Thus, theoretically reducing the distance between particles can reduce the need for the amount of particle polymer needed. However, if the particles become too numerous, the wetted particles can begin to negatively affect the adhesive bond strength.

The quantity or volume of water absorbing particles contained in the layer composition resulting in the formed film is determined by the quantity of water to be absorbed from the adhesive. This can be calculated based upon the percentage of water in the adhesive and weight applied, and the absorption value of these resins.

In one embodiment, the water retentive layer composition can contain on a weight percent basis about 45% to about 99% polymer binder, about 1% to about 10% super absorbent water retentive particles and optional hydrophilic additive. The water retentive layer composition may be further applied to a decorative surface covering and cured, if required. The layer composition is typically cured on the back side of the decorative surface covering to form a layer having a water permeable polymer binder matrix and super absorbent water retentive particles. Curing typically includes drying the layer composition, but may include any process that forms a layer on the surface covering.

A further embodiment includes a flooring system comprising a substrate, a decorative surface covering having a substantially non-aqueous absorptive layer and a water retentive layer interposed between the substantially non-aqueous absorptive layer and the substrate to which the decorative surface covering is adhered by a water-based adhesive. The water retentive layer includes a water permeable polymer binder matrix and super absorbent water retentive particles. The substrate may be a flooring subfloor. Additionally, the flooring subfloor may be substantially non-absorptive to water. The term "substantially non-aqueous absorptive" means a layer and/or substrate that deters passage of water to the extent that a water-based adhesive will not cure within about 48 hours.

EXAMPLES

Example 1

| PVC Lacquer Based Back Coating | |
|---|---|
| On a wet percent basis: | |
| VAGF | 13.4 (Union Carbide solution vinyl chloride copolymer resin) |
| MEK | 50.0 (methyl ethyl ketone) |
| MIBK | 12.5 (methyl isobutyl ketone) |
| Thermolite T-31 | 0.3 (a PVC heat stabilizer sold by Atofina Chemicals, Inc) |
| UVOB | 0.008 (ultraviolet optical brightener) |
| PEG 600 | 19.0 (polyether glycol having a molecular weight of about 600) |
| Super absorbent particles | 4.8 |

The super absorbent particles were Aqua Crystals (sodium polyacrylate particles obtained from Craftstore.com). These particles were ground using an Alpine grinder to a particle size of about 7 mils to about 10 mils. Additionally, particles that were about 2 mils to about 6 mils were also produced.

The formulation above using the about 7 mil to about 10 mil particles was stirred together, and then applied to the back of non-aqueous absorptive, vinyl-backed, commercially available, sheet flooring using a #52 wire wound rod. The application weight was about 13 g/SF. This sample was dried at 200° F. for 1 hour. A second sample using the about 2 mil to about 6 mil super absorbent particles was similarly prepared. A third sample with about 2 mil to about 6 mil super absorbent particles, but without the PEG 600 material was also prepared.

Following drying, the samples were tested by installing them on a sheet of polyethylene. Armstrong S-235 adhesive (available through Ardex Inc.), which is about 33% by weight water was applied at about 15 g/SF using a fine notch trowel. The lacquer back coated flooring samples were installed into the wet adhesive, then checked after 60 hours by pulling the flooring off of the polyethylene. The samples containing PEG 600 and the super absorbent particles were dried with good bond, while both the sample with no back coating and the sample without PEG 600 were still wet with a poor bond.

Example 2

| PVC Plastisol Based Back Coating | |
|---|---|
| On a wet percent basis: | |
| Vinyl plastisol (parts by weight) | 71 |
| Vinyl homopolymer dispersion resin | 90 |
| Vinyl homopolymer blending resin | 10 |
| Primary phthalate plasticizer | 30.6 |
| Secondary plasticizer | 20 |
| Stabilizer | 3 |
| Viscosity control agent | 0.5 |
| Epoxidized soya oil | 2 |
| BASF antistat HHTS 905 | 26.5 |
| Super absorbent particles | 2.5 |

The super absorbent particles of sodium polyacrylate were ground to about 2 mils to about 6 mils. These materials were hand stirred together, then applied to polypropylene coated release paper using a #52 wire wound rod. The application weight was about 8.5 g/SF. The sample was gelled at 320° F. for 5 minutes. Then the super absorbent particle coated release paper was laminated to the back of non-aqueous absorptive flooring in a flat press (300° F. for 5 minutes). A second control sample was made without the anti-static material.

Following drying, the samples were tested by installing them on polyethylene. Armstrong S-235 adhesive was applied with a fine notch trowel at about 15 g/SF onto a sheet of polyethylene. The flooring samples were installed onto the wet adhesive.

After about 24 hours, one corner of each sample was pulled up slowly and the stringing/adhesion evaluated. The adhesive under the control sample without the antistatic agent was still wet and no stringing of the adhesive was observed. The sample containing the antistatic agent was nearly dry and stringing of the adhesive was seen.

Example 3

Installation Over Existing Flooring with Embossing Leveler

The PVC lacquer based back coating of Example 1 with the super adsorbent particles and PEG 600 was similarly processed onto the back of a vinyl-backed sheet flooring product (Armstrong's Translations™). Eleven grams (wet) was applied to the back of the Translations product (an 11"×11" sample), dried in an oven at 200° F. until a constant weight of 4 g was achieved. The dried coating contained about 0.5 g of the water retentive particles. This could theoretically absorb about 50 g of water.

To simulate installation over an existing vinyl floor, a sample of embossed vinyl resilient floor was coated and "leveled" using Armstrong's S-199 embossing leveler. After the embossing leveler has dried (48 hours), the lacquer coated vinyl-backed sheet flooring was installed using the same conditions of Example 1. After one hour, the sample was tested and shown to have good adhesive bond.

The concept was to combine the super absorbent polymer particles (SAPP) (water retentive particles) with a matrix that lets water into these particles but otherwise remains unaffected at the site of attachment of the installation adhesive. In one embodiment, the SAPP is widely spaced as possible so that the wetted SAPP only comprise a small percentage of adherable work area of the back of the flooring material.

The amount of water vapor passing through a given area of a plastic sheet or film in a given time, when the sheet or film is maintained at a constant temperature and when its faces are exposed to certain different relative humidities, can be characterized as water vapor transmission rates. Vapor moving through an article is also influenced by the thickness of the article. Step Master™, an Armstrong coated tile product, transmitted 0.015 g/24 hr/100 in$^2$. If 10 grams of adhesive are applied per SF at 50% water, it would take 231 days for this water to get through Step Master product. The result is usually expressed as grams per 24 hours per square meter (g/24 hr·m$^2$).

The described additives can be used to increase the moisture migration properties of polymer binder systems. For PVC, the moisture sensitive additives can include low molecular weight polymers that have some hydrophilic nature, such as the polyether glycol materials (PEG), or some anti-static agents. The nature of the additives that may be employed vary with each polymer binder layer system used. The additives should be able to be added to the polymeric binder and result in little to no detrimental change in polymer layer physical properties. Additionally, the additives can enhance the ability of the polymeric layer to allow migration of moisture to the water retentive particles to occur at the right rate to not only dry the adhesive, but also produce good bond within 24 to 48 hours. Additionally, the polymer binder layer should not detrimentally affect the ability of the adhesive to adhere to the non-porous subfloor or flooring underneath.

While an embodiment of the present invention as illustrated and described above has been set forth, it is recognized that variations may be made with respect to the disclosed embodiments. Therefore, while the invention has been disclosed in various forms only, it will be obvious to those skilled in the art that many additions, deletions and modifications can be made without departing from the spirit and scope of this invention, and no undue limits should be imposed except as set forth in the following claims.

What is claimed is:

1. A water retentive composition comprising a polymer binder, super absorbent water retentive particles and a hydrophilic additive, wherein the water retentive composition comprises
   about 45% to about 99% by weight of the polymer binder;
   about 1% to about 10% by weight of the super absorbent water retentive particles; and
   about 1% to about 50% by weight of the hydrophilic additive.

2. The water retentive composition of claim 1, wherein the hydrophilic additive is a polyether glycol.

3. The water retentive composition of claim 1, wherein the super absorbent water retentive particles comprise polyacrylic acid or a salt thereof.

4. The water retentive composition of claim 3, wherein the polyacrylic acid salt is sodium polyacrylate.

5. The water retentive composition of claim 1, wherein the polymer binder is water permeable.

6. The water retentive composition of claim 1, wherein the polymer binder is hydrophobic.

7. The water retentive composition of claim 6, wherein the polymer binder comprises a polyolefin.

8. A multi-layered article comprising two substantially non-porous layers, a water retentive layer interposed between the two non-porous layers and a water-based adhesive interposed between the two non-porous layers, wherein the water retentive layer comprises a water permeable polymer binder and super absorbent water retentive particles, and wherein the water retentive layer is adjacent the water-based adhesive.

9. The multi-layered article of claim 8, wherein the super absorbent water retentive particles are dispersed within the water permeable polymer binder.

10. The multi-layered article of claim 8, wherein the super absorbent water retentive particles comprise polyacrylic acid or salts thereof.

11. The multi-layered article of claim 10, wherein the polyacrylic acid salt is sodium polyacrylate.

12. The multi-layered article of claim 8, wherein the water retentive layer on a weight percent basis comprises about 45% to about 99% by weight of the water permeable polymer binder; and about 1% to about 10% by weight of the super absorbent water retentive particles.

13. A multi-layered article comprising two substantially non-porous layers, a water retentive layer interposed between the two non-porous layers and a water-based adhesive interposed between the two non-porous layers, wherein the water retentive layer comprises a hydrophobic polymer binder and super absorbent water retentive particles, and wherein the water retentive layer is adjacent the water-based adhesive.

14. The multi-layered article of claim 13, wherein the hydrophobic polymer binder comprises a polyolefin.

15. The multi-layered article of claim 13, wherein the super absorbent water retentive particles are dispersed within the hydrophobic polymer binder.

16. The multi-layered article of claim 13, wherein the super absorbent water retentive particles comprise polyacrylic acid or salts thereof.

17. The multi-layered article of claim 16, wherein the polyacrylic acid salt is sodium polyacrylate.

18. The multi-layered article of claim 13, wherein the water retentive layer further comprises a hydrophilic additive.

19. The multi-layered article of claim 13, wherein the hydrophobic polymer binder comprises a polyvinyl chloride polymer or copolymer.

20. The multi-layered article of claim 13, wherein the water retentive layer on a weight percent basis comprises about 45% to about 99% by weight of the hydrophobic polymer binder; and about 1% to about 10% by weight of the super absorbent water retentive particles, and wherein the water retentive layer further comprises an hydrophilic additive, the water retentive layer comprising on a weight percent basis about 1% to about 50% by weight of the hydrophilic additive.

21. The multi-layered article of claim 18, wherein the hydrophilic additive is a polyether glycol.

22. The water retentive composition of claim 6, wherein the hydrophobic polymer binder comprises a polyvinyl chloride polymer or copolymer.

* * * * *